United States Patent [19]

Suzuki et al.

[11] Patent Number: 4,821,527
[45] Date of Patent: Apr. 18, 1989

[54] COOLING DEVICE EQUIPPED WITH A VARIABLE DISPLACEMENT TYPE COMPRESSOR

[75] Inventors: Shinichi Suzuki; Jun Hasegawa; Kenji Takenaka, all of Kariya, Japan

[73] Assignee: Kabushiki Kaisha Toyoda Jidoshokki Seisakusho, Aichi, Japan

[21] Appl. No.: 70,927

[22] Filed: Jul. 8, 1987

[30] Foreign Application Priority Data

Jul. 17, 1986 [JP] Japan .................. 61-168828

[51] Int. Cl.$^4$ ........................... F25B 1/00
[52] U.S. Cl. ..................... 62/209; 62/228.5
[58] Field of Search ............. 62/209, 227, 228.5, 62/228.4

[56] References Cited

U.S. PATENT DOCUMENTS

| | | | |
|---|---|---|---|
| 4,102,150 | 7/1978 | Kountz | 62/196.3 X |
| 4,481,789 | 11/1984 | Akimoto et al. | 62/209 |
| 4,517,812 | 5/1985 | Umezu | . |

Primary Examiner—William E. Wayner
Attorney, Agent, or Firm—Burgess, Ryan & Wayne

[57] ABSTRACT

A cooling device comprising a variable displacement type compressor, a condenser, an expansion valve and an evaporator. The displacement of the compressor is controlled in response to both the actual evaporation temperature of refrigerant and the actual condensing temperature of the refrigerant, so that the actual evaporation temperature approaches a predetermined desired evaporation temperature which is reduced as the actual condensing temperature is increased.

11 Claims, 6 Drawing Sheets

COOLING DEVICE EQUIPPED WITH A VARIABLE DISPLACEMENT TYPE COMPRESSOR

BACKGROUND OF THE INVENTION

1. Field of the Invention

The present invention relates to a cooling device equipped with a variable displacement type compressor.

2. Description of the Related Art

In a cooling device comprising a compressor, a condenser and an evaporator, if the cooling load becomes high, the temperature of the evaporator is increased. If the temperature of the evaporator is increased, the cooling ability is decreased, and thus it becomes impossible to sufficiently cool an object or space to be cooled.

To eliminate this problem, an air conditioning system of a vehicle has been equipped with a variable displacement type compressor. In this air conditioning system, the compressor displacement is controlled so that the temperature of the evaporator is maintained at a predetermined fixed desired temperature. That is, when the cooling load becomes high, and accordingly the temperature of the evaporator is increased, the compressor displacement is increased. As a result, since the amount of refrigerant fed into the evaporator is increased, the temperature of the evaporator is decreased. Conversely, when the cooling load becomes low, and accordingly the temperature of the evaporator is decreased, the compression displacement is decreased. As a result, since the amount of refrigerant fed into the evaporator is decreased, the temperature of the evaporator is increased.

However, when the above-mentioned fixed desired temperature of the evaporator is low, and the temperature of the outside air is low, frost adheres to the evaporator and to the conduit between the evaporator and the expansion valve. Accordingly, to prevent frost from adhering to the evaporator and the conduit, it is necessary to set the fixed desired temperature of the evaporator as high as possible. Nevertheless, when the fixed desired temperature of the evaporator is set high, when the cooling load becomes high, the capability of abruptly reducing the temperature of, for example, the driver's compartment, is decreased. That is, the so called temperature reduction characteristic is weakened. Consequently, when the fixed desired temperature of the evaporator is fixed to a certain temperature as in the above-mentioned air conditioning system, a problem occurs in that it is impossible to prevent frost from adhering to the evaporator and the conduit if a good temperature reduction characteristic is to be obtained.

SUMMARY OF THE INVENTION

An object of the present invention is to provide a cooling device capable of preventing the adhesion of frost while obtaining a good temperature reduction characteristic.

According to the present invention, there is provided a cooling device having a variable displacement type compressor, a condenser, an expansion valve and an evaporator. This device comprises: a first means for detecting a condensing temperature of refrigerant in the condenser, a second means for detecting an actual evaporation temperature of refrigerant in the evaporator, a valve means controlling the displacement of the compressor, a control means controlling the valve means in response to signals output by the first means and the second means to bring the actual evaporation temperature close to a predetermined desired evaporation temperature, which temperature is determined by the condensing temperature and becomes low as the condensing temperature becomes high.

The present invention may be more fully understood from the description of a preferred embodiment of the invention set forth below, together with the accompanying drawings.

DESCRIPTION OF A PREFERRED EMBODIMENT

Figure 1:
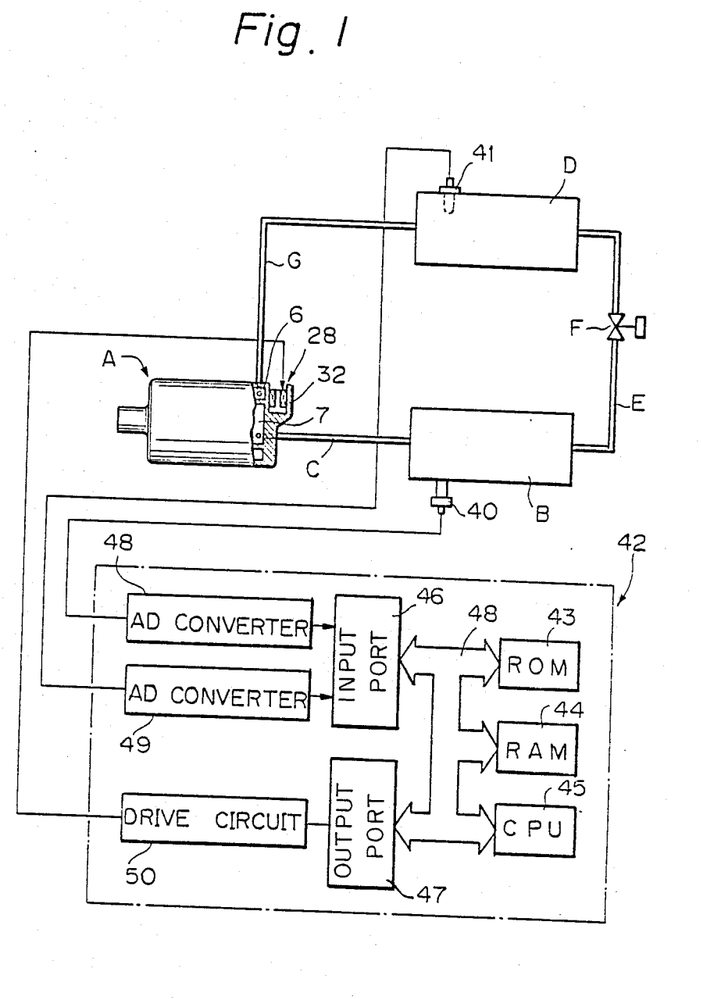
FIG. 1 is a schematically illustrated view of a cooling device according to the present invention.

FIG. 1 illustrates a cooling device applicable to an air conditioning system of a vehicle. Referring to FIG. 1, the cooling device comprises a variable displacement type compressor A, a condenser B connected to the discharge side of the compressor A via a conduit C, an evaporator D connected to the outlet of the condenser B via a conduit E, and an expansion valve F arranged in the conduit E. The outlet of the evaporator D is connected to the suction side of the compressor A via a conduit G. Refrigerant pressurized in the compressor A is fed to the condenser B via the conduit C. This refrigerant under pressure is cooled and condensed in the condenser B, and a liquified refrigerant under pressure is formed in the condenser B. The liquified refrigerant under pressure is then fed into the evaporator D via the conduit E and the expansion valve F. After the liquified refrigerant under pressure has passed through the expansion valve F, the pressure of the liquified refrigerant is decreased, and the refrigerant expands. At this time, at least part of the liquified refrigerant is vaporized, and thus the temperature of the refrigerant is decreased due to the latent heat of the vaporized liquified refrigerant. Consequently, the evaporator D is filled with refrigerant having a low temperature. The heat of air around the evaporator D is absorbed by the evaporator D, and the refrigerant is then returned to the compressor A via the conduit G. When this cooling device is applied to an air conditioning system of a vehicle, the condenser B is normally arranged in the engine compartment so that it is cooled by the outside air, and the evaporator D is arranged in the driver's compartment to cool the air therein.

Figure 2:
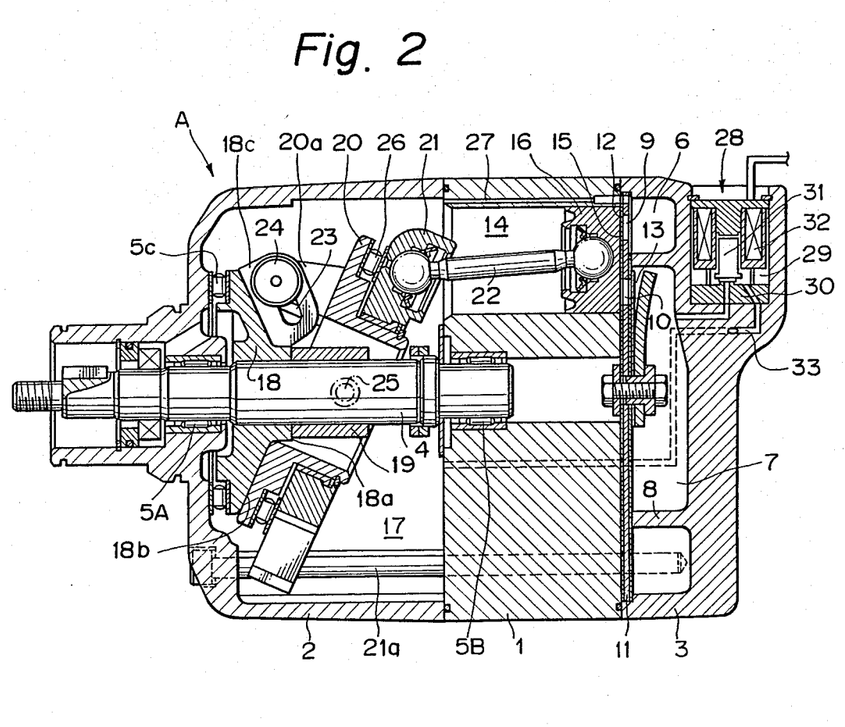
FIG. 2 is a cross-sectional side view of a compressor, illustrating the maximum displacement state.

In the embodiment illustrated in FIG. 1, the variable displacement compressor A is provided with a variable angle wobble plate. FIG. 2 illustrates this variable displacement compressor A. Referring to FIG. 2, a cylinder block 1 is provided on a right end face thereof with a valve plate 11 through which a rear housing or compressor head 3 is connected and fixed to the cylinder block 1 with an appropriate fastening means. The left end face of the cylinder block 1 is connected and fixed to a front housing or crankcase 2 having a bearing 5A for rotatably supporting a drive shaft 4 described later. The compressor head 3 is formed therein with an annular suction chamber 6 and a central discharge chamber which are concentrically arranged and separated from one another by a partition wall 8. The suction chamber 6 is connected to the evaporator D via the conduit G, and the discharge chamber 7 is connected to the condenser B via the conduit C (FIG. 1). Also, the suction and discharge chambers 6 and 7 are fluidly connectable to a later described compression chamber 15 of each of a plurality of cylinder bores 14 formed in the cylinder block 1 via a suction port 9 and a discharge port 10, respectively. The suction port 9 is closed by a suction valve 12 which is opened when an associated piston 16 carries out a suction stroke thereof in the cylinder bore 14. The discharge port 10 is closed by a discharge valve 13 which is opened when the associated piston 16 carries out a compression stroke thereof in the cylinder bore 14. The cylinder block 1 has at its center a hearing 5B mounted therein so as to be coaxial and to cooperate with the afore-mentioned bearing 5A for rotatably supporting the drive shaft 4. The cylinder block 1 also has the afore-mentioned cylinder bores 14 circumferentially arranged so as to surround the bearing 5B. In each of the cylinder bores 14, the afore-mentioned piston 16 is slidably and reciprocally fitted so as to define the afore-mentioned compression chamber 15 on the rear side of the cylinder block 1. Thus, the compression chamber 15 is alternately connected with the afore-mentioned suction chamber 6 and discharge chamber 7 via suction and discharge ports 9 and 10 in response to the reciprocating motion of the piston 16.

The crankcase 2 has therein a cylindrical chamber 17 which is communicated with all of the cylinder bores 14 of the cylinder block 1. The cylindrical chamber 17 receives therein the afore-mentioned drive shaft 4 axially arranged in the chamber 17 between the above-mentioned pair of bearing 5A and 5B. An outer end of the drive shaft 4 is outwardly extended over the front end of the crankcase 2 so that it is connectable to a vehicle engine (not shown) via an appropriate transmission unit and a clutch device. On the drive shaft 4 is mounted a drive element 18 referred to as a lug plate. The lug plate 18 having a generally round configuration is rotatably held by a thrust bearing 5C against a front inner wall of the crankcase 2 and is able to rotate with the drive shaft 4. The lug plate 18 is provided, on its inner end, with an end face 18a with which a later-described sleeve element 19 is able to come in contact during the large displacement operation of the compressor. The lug plate 18 is also provided, around the end face 18a, with an inclined end face 18b with which a drive plate 20 is able to come in contact during the wobbling thereof, and a support arm 18c for supporting the drive plate 20. The support arm 18c and the inclined end face 18b are arranged so as to be circumferentially spaced apart from one another by an angle of approximately 180 degrees. The drive plate 20 formed as an annular member enclosing the drive shaft 4 is supported by the support arm 18c so that it is able to wobble about an axis vertical to the axis of the drive shaft 4. That is, the drive plate 20 is able to wobble so as to incline with respect to a plane perpendicular to the axis of the drive shaft 4. The support arm 18c is formed with an arcuate hole 23 of which the center of curvature passes through points where a later described wobble plate 21 and connecting rods 22 are pivotally connected together via ball and socket joints during the rotation of the lug plate 18. On the other hand, the drive plate 20 has a bracket 20a extending toward and mated with the support arm 18c of the lug plate 18. The bracket 20a and the support arm 18c is operatively connected together by means of a guide pin 24 fixed to the bracket 20a and movably engaged in the arcuate hole 23 of the support arm 18c so that the drive plate 20 is permitted to wobble against the lug plate 18 while it is rotating with the drive shaft 4. The sleeve element 19 which is slidably mounted on the drive shaft 4 is connected to the drive plate 20. That is, the cylindrical sleeve element 19 has a pair of diametrically opposed pivots 25 on which the drive plate 20 is pivotally mounted. The drive plate 20 holds thereon a non-rotating wobble plate 21 by means of a thrust bearing 26. The wobble plate 21 is permitted to carry out only a wobbling motion together with the drive plate 20 and is formed as an annular element enclosing the drive shaft 4. The non-rotating wobble plate 21 is operatively connected with the afore-mentioned respective pistons 16 by means of respective connecting rods 22 and ball and socket joints provided on both ends of each connecting rod 22. At this stage, it should be noted that the connections between the wobble plate 21 and respective pistons 16 are established in such a manner that each of the pistons 16 is brought into its top dead center (i.e., the rearmost position in each cylinder bore 14) by the wobble plate 21 via the associated connecting rod 22 when the support arm 18c of the lug plate 18 is rotated to a position where the arm 18c is in axial alignment with each of the cylinder bores 14. The wobbling motion of the non-rotating wobble plate 21 is guided by a guide pin 21a fixedly and axially extended through the crankcase 2, cylinder block 1, and the compressor head 3.

The cylinder block 1 is formed with a fluid passageway 27 in the form of a through-bore extending axially so as to provide a constant fluid communication between the suction chamber 6 of the compressor head 3 and the chamber 17 of the crankcase 2.

Figure 4:
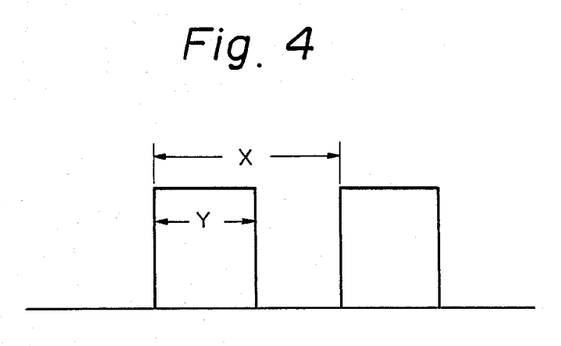
FIG. 4 is a diagram showing pulses applied to the control valve.

The compressor head 3 is provided with a control valve 28 for changing the wobble angle of the drive and wobble plate 20 and 21 through controlling a pressure level within the crankcase chamber 17. The control vale 28 comprises a valve chamber 29, a valve port 30 which is open to the valve chamber 29 and connected to the discharge chamber 7, a valve body 31 controlling the opening operation of the valve port 30, a solenoid 32 actuating the valve body 31, and a fluid passageway 33 interconnecting the valve chamber 29 to the crankcase chamber 17. When the valve body 31 closes the valves port 30, the crankcase chamber 17 is connected to only the suction chamber 6 via the fluid passageway 27, and thus, at this time, the pressure in the crankcase chamber 17 is low. Conversely, when the valve body 31 opens the valve port 30, the crankcase chamber 17 is also connected to the discharge chamber 7 via the fluid passageway 33, and thus the pressure in the crankcase chamber 17 becomes high. In the present invention, continuous pulses are applied to the solenoid 32, and when a pulse is applied to th esolenoid 32, the valve body 31 opens the valve port 30. FIG. 4 illustrates pulses applied to the solenoid 32. These pulses are generated at a fixed interval X, and the width Y of each pulses is controlled. The ratio of Y to X is called the duty ratio, and therefore, the duty ratio is controlled. As the duty ratio becomes high, the length of time during which the valve body 31 opens the valve port 30 becomes long, and thus the pressure in the crankcase chamber 17 is increased.

When the piston 16 is in the suction stroke, the pressure in the corresponding compression chamber 15 becomes approximately equal to the lower pressure in the suction chamber 6, and when the piston 16 is in the compression stroke, the pressure in the corresponding compression stroke 15 becomes high. The pressures in the compression chambers 15 provide the forces $F_l$ toward the left in FIG. 2 for the corresponding piston 16. Consequently, the sum of the forces $F_l$ acts on the drive and wobble plates 20 and 21 toward the left in FIG. 2. In addition, the pressure in the crankcase chamber 17 provides the forces $F_r$ towards the right in FIG. 2 for the pistons 16. Consequently, the sum of the forces $F_r$ acts on the drive and wobble plates 20 and 21 toward the right in FIG. 2. Since the sleeve element 19 pivotally supporting the drive plate 20 is slidably mounted on the drive shaft 4, the sum of the forces $F_l$ and the sum of the forces $F_r$ are borne by the support arm 18c via the guide pin 24. Consequently, the sum of the forces $F_l$ provides the clockwise moment $M_l$ about the guide pin 24 for the drive and wobble plate 20, and the sum of the forces $F_r$ provides the counter-clockwise moment $M_r$ about the guide pin 24 for the drive and wobble plates 20 and 21. The drive and wobble plates 20 and 21 are maintained at an inclined position where the moments $M_l$ and $M_r$ are balanced. When the pressure in the crankcase chamber 17 is low, the counter-clockwise moment $M_r$ is small, and thus, at this time, the drive plate 20 takes a position in which it is seated on the inclined end face 18b, as illustrated in FIG. 2. At this time, the stroke of the pistons 16 becomes maximum, and thus the displacement of the compressor A becomes maximum.

Figure 3:
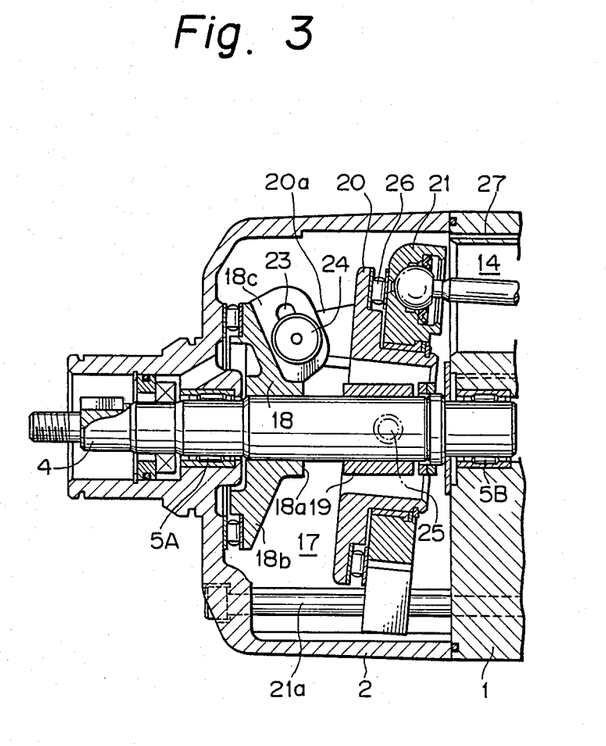
FIG. 3 is a cross-sectional side view of a portion of the compressor, illustrating the minimum displacement state.

Conversely, when the pressure in the crankcase chamber 17 becomes high, the counter-clockwise moment $M_r$ becomes large. As a result, the drive and wobble plates 20 and 21 are rotated in the counter-clockwise direction, and the drive and wobble plates 20 and 21 approach the cylinder block 1. As a result, the displacement of the compressor A is reduced. When the pressure in the crankcase chamber 17 becomes higher, the drive and wobble plates 20 and 21 further approach the cylinder block 1, as illustrated in FIG. 3. At this time, the displacement of the compressor A becomes minimum.

As mentioned above, the displacement of the compressor A is reduced as the pressure in the crankcase chamber 17 becomes high. In addition, as mentioned previously, the pressure in the crankcase chamber 17 becomes high as the duty ratio of the pulses applied to the solenoid 32 of the control valve 28 becomes large. Consequently, the displacement of the compressor A can be controlled by the control valve 28, and the displacement of the compressor A is reduced as the duty ratio of the pulses applied to the solenoid 32 becomes large.

Turning to FIG. 1, a temperature sensor 40 for detecting the condensing temperature of the refrigerant is arranged on the condenser B, and another temperature sensor 41 for detecting the evaporation temperature of the refrigerant is arranged in the interior of the evaporator D. However, the temperature sensor 41 may be arranged on the outer face of the evaporator D. In this case, preferably the temperature sensor 41 is covered by a heat insulating material so that the ambient temperature does not affect the temperature sensor 41. These temperature sensors 40 and 41 are connected to an electronic control unit 42.

The electronic control unit 42 is constructed as a digital computer and comprises a ROM (read only memory) 43, a RAM (random access memory) 44, a CPU (microprocessor, etc.) 45, an input port 46 and an output port 47. The ROM 43, the RAM 44, the CPU 45, the input port 46, and the output port 47 are interconnected via a bidirectional bus 48. The temperature sensor 40 produces an output voltage which is proportional to the condensing temperature of the refrigerant, and the temperature sensor 41 produces an output voltage which is proportional to the evaporation temperature of the refrigerant. These temperature sensors 40 and 41 are connected to the input port 46 via corresponding AD converters 48 and 49. The output port 47 is connected to the solenoid 32 of the control valve 28 via a drive circuit 50.

Figure 5:
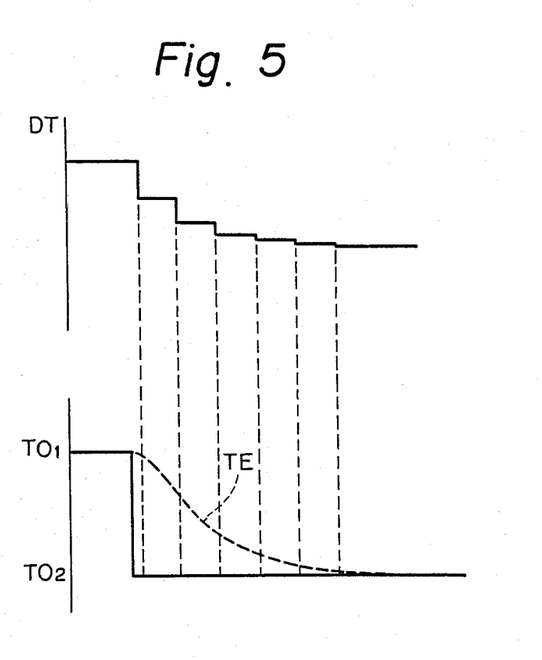
FIG. 5 is a diagram illustrating changes in the duty ratio of pulses and the actual evaporation temperature.
Figure 6A:
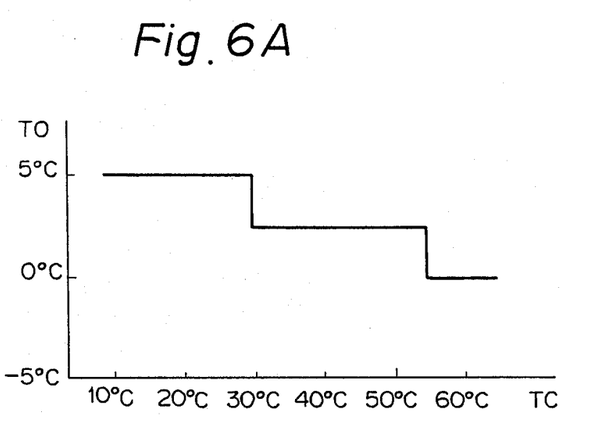
FIGS. 6A & 6B are diagrams showing the relationship between the desired evaporation temperature and the condensing temperature.
Figure 6B:
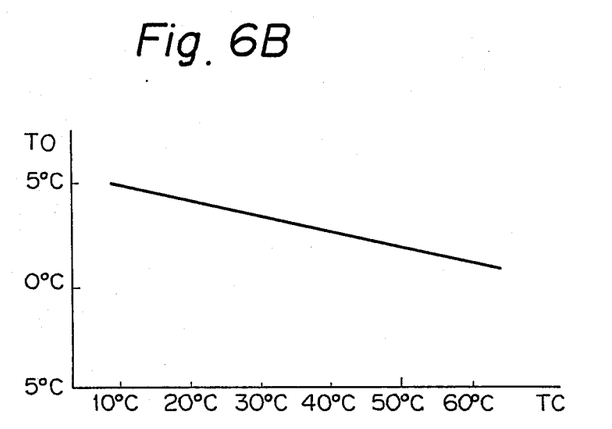

FIG. 5 illustrates a change in the duty ratio DT of the pulses applied to the solenoid 32 when the desired evaporation temperature TO of the refrigerant is changed. FIG. 6 illustrates the relationship between the desired evaporation temperature TO and the condensing temperature TC of the refrigerant. In the first example illustrated in FIG. 6A, the desired evaporation temperature TO is reduced stepwise as the condensing temperature TC is increased. In the second example illustrated in FIG. 6B, the desired evaporation temperature TO is linearly reduced as the condensing temperature TC is increased. The relationship illustrated in FIGS. 6A or 6B is stored in the ROM 43 in the form of a map or data table.

In the present invention, when the condensing temperature TC is changed, the actual evaporation temperature is controlled so that it becomes equal to the desired evaporation temperature TO determined by the condensing temperature TC. That is, as illustrated in FIG. 5, for example, if the desired evaporation temperature TO is changed from $TO_1$ to $TO_2$, the duty ratio DT is gradually decreased. If the duty ratio DT is decreased, the displacement of the compressor A is increased, and thus the actual evaporation temperature is reduced, as illustrated by the broken line TE in FIG. 5. From FIG. 5, it will be understood that, as the difference between the actual evaporation temperature TE and the desired evaporation temperature $TO_2$ is reduced, the decrease in the duty ratio DT is reduced.

When the cooling load becomes high, the condensing temperature TC is accordingly increased. However, if the condensing temperature TC is increased, the desired evaporation temperature TO becomes low, and thus the actual evaporation temperature TE becomes low. As a result, since the cooling ability of the cooling system is increased, the temperature in, for example, the driver's compartment, is abruptly decreased, and thus a good temperature reduction characteristic can be obtained.

Conversely, when the cooling load becomes low, the condensing temperature TC is accordingly reduced. However, if the condensing temperature TC is reduced, the desired evaporation temperature TO becomes high, and thus the actual evaporation temperature TE becomes high. Consequently, at this time, even if the temperatures of outside air is low, there is no danger that frost will adhere to the evaporator D and the conduit E.

Figure 7:
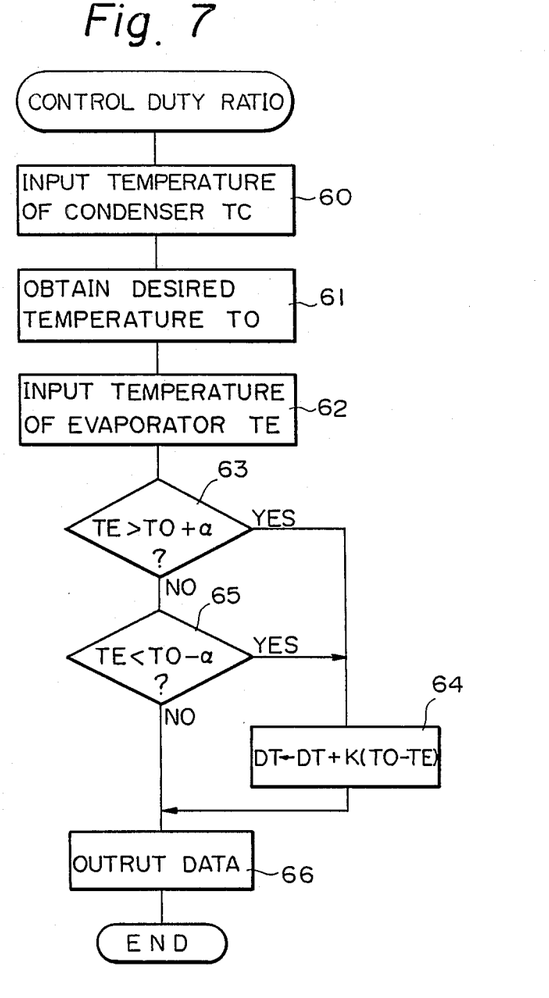
FIG. 7 is a flow chart of the execution of the control of the duty ratio of the pulses.

FIG. 7 illustrates a flow chart of the execution of the control of the duty ratio DT according to the present invention. The routine illustrated in FIG. 7 is processed by sequential interruptions which are executed every predetermined time.

Referring to FIG. 7, in step 60, the output signal of the temperature sensor 40, which represents the condensing temperature TC of refrigerant in the condenser B, is input to the CPU 45. Then, in step 61, the desired evaporation temperature TO is obtained from the relationship illustrated in FIG. 6, and stored in the ROM 43. Then, in step 62, the output signal of the temperature sensor 41, which represents the actual evaporation temperature TE of refrigerant in the evaporator D, is input to the CPU 45. Then, in step 63, it is determined whether the actual evaporation temperature TE is higher than the desired evaporation temperature TO plus a small fixed value $\alpha$. IF TE>TO+$\alpha$, the routine goes to step 64, and the duty ratio DT is changed by K(TO−TE), where K is constant. If TE≦TO+$\alpha$, the routine goes to step 65, and it is determined whether the actual evaporation temperature TE is lowered than the desired evaporation temperature TO minus $\alpha$. If TE<TO - $\alpha$, the routine goes to step 64, and if TE≧TO−$\alpha$, the routine goes to step 66. In step 66, data representing the duty ratio DT is output to the output port 47, and the control valve 28 is controlled by this data.

As mentioned above, when the cooling load becomes low, the displacement of the compressor A is controlled so that it becomes low. As a result, the amount of refrigerant recycled in the cooling device is reduced, and thus there is a danger that the temperature of the compressor A will increase due to the lack of lubricating oil and, finally, a seizure of the compressor A will occur. However, in the present invention, when the temperature of the compressor A is increased, and the condensing temperature TC is accordingly increased, the compressor A is controlled so that the displacement thereof is increased. As a result, the amount of refrigerant recycled in the cooling device is increased, and thus it is possible to prevent a seizure of the compressor A.

FIGS. 1 through 3 illustrate the case where the present invention is applied to the compressor A equipped with the wobble plate 21. However, the present invention may be applied to a rotary type compressor having a spool valve which controls the direct return of refrigerant from the compression chamber to the suction side of the compressor on the basis of the pressure in the pressure control chamber of the spool valve. In this case, the displacement of the rotary type compressor is controlled by controlling the duty ratio of pulses applied to the control valve which controls the pressure of the pressure control chamber of the spool valve.

According to the present invention, it is possible to prevent frost from adhering to the evaporator and the conduit while obtaining a good temperature reduction characteristic.

While the invention has been described by reference to a specific embodiment chosen for purposes of illustration, it should be apparent that numerous modifications could be made thereto by those skilled in the art without departing from the basic concept and scope of the invention.

We claim:

1. A cooling device having a variable displacement type compressor, a condenser, an expansion valve and an evaporator, said device comprising:
   first means for detecting a condensing temperature of refrigerant in the condenser;
   second means for detecting an actual evaporation temperature of refrigerant in the evaporator;
   valve means controlling the displacement of the compressor;
   control means controlling said valve means in response to output signals of said first means and said second means to cause the actual evaporation temperature to approach a predetermined desired evaporation temperature, which temperature is determined by the condensing temperature and becomes low as the condensing temperature becomes high whereby the compressor displacement is increased as the condensing temperature is increased, at low compressor loads, and lubrication of the compressor can be insured.

2. A cooling device according to claim 1, wherein the displacement of the compressor is controlled by a fluid pressure, and said valve means comprises a control valve controlling said fluid pressure.

3. A cooling device according to claim 2, wherein the compressor comprises: a suction chamber for the refrigerant; a plurality of cylinder bores arranged so as to surround an axial drive shaft and having therein associated reciprocatory pistons disposed so as to draw the refrigrant from the suction chamber and to then discharge the refrigerant after compression into a discharge chamber; a crankcase having therein a chamber communicating with the cylinder bores and containing therein a drive plate mounted in such a manner that it is capable of rotating with the axial drive shaft as well as changing an inclination thereof with respect to the axial drive shaft; a non-rotating wobble plate held by the drive plate; a plurality of connecting rods connecting between the wobble plate and pistons; an annular sleeve element axially slidably mounted on said drive shaft and pivotally supporting said drive plate; and a support plate arranged on said drive shaft to be rotatable therewith for wobblingly supporting said drive plate on which said wobble plate is non-rotatably held, said support plate being formed with a lug-shaped support arm having a curved hole in which a guide pin fixed to a bracket of said drive plate is movably engaged, the fluid pressure in the chamber of said crankcase being controlled by said control valve and changing an inclination of said drive and wobble plates to change the displacement of the compressor.

4. A cooling device according to claim 3, further comprising a first passageway which innerconnects said suction chamber to the chamber of said crankcase, and a second passageway which interconnects said discharge chamber to the chamber of said crankcase, said control valve being arranged in said second passageway to control the fluid pressure in the chamber of said crankcase.

5. A cooling device according to claim 2, wherein said control valve comprises a solenoid valve controlling said fluid pressure and controlled by said control means.

6. A cooling device according to claim 1, wherein said control means comprises a memory storing the relationship between said desired evaporation temperature and said condensing temperature, duty ratio determining means determining a duty ratio of pulses, which is necessary to cause said actual evaporation temperature to approach said desired evaporation temperature, and drive means feeding said pulses to said valve means.

7. A cooling device according to claim 6, wherein said duty ratio is gradually changed when said actual evaporation temperature deviates from said desired evaporation temperature.

8. A cooling device according to claim 7, wherein the degree of change in said duty ratio becomes small as the difference between said actual evaporation temperature and said desired evaporation temperature becomes small.

9. A cooling device according to claim 1, wherein said desired evaporation temperature is reduced stepwise as the condensing temperature is increased.

10. A cooling device according to claim 1, wherein said desired evaporation temperature is linearly reduced as the condensing temperature is increased.

11. A cooling device according to claim 1, wherein the displacement of the compressor is reduced when said actual evaporation temperature is lower than said desired evaporation temperature, and the displacement of the compressor is increased when said actual evaporation temperature is higher than said desired evaporation temperature.

* * * * *